US008239543B1

(12) United States Patent
Ramany et al.

(10) Patent No.: US 8,239,543 B1
(45) Date of Patent: Aug. 7, 2012

(54) METHOD AND AN APPARATUS TO PROVIDE ACCESS TO OPERATIONAL DATA IN A STORAGE SERVER VIA MULTIPLE DATA MANAGEMENT PROTOCOLS

(75) Inventors: Swaminathan Ramany, Sunnyvale, CA (US); Manpreet Singh, Sunnyvale, CA (US); Darren Sawyer, San Carlos, CA (US)

(73) Assignee: NetApp, Inc., Sunnyvale, CA (US)

( * ) Notice: Subject to any disclaimer, the term of this patent is extended or adjusted under 35 U.S.C. 154(b) by 1635 days.

(21) Appl. No.: 10/806,703

(22) Filed: Mar. 22, 2004

(51) Int. Cl.
  *G06F 15/16* (2006.01)
(52) U.S. Cl. ...................................... 709/227; 711/162
(58) Field of Classification Search .................. 709/230, 709/223; 711/162
  See application file for complete search history.

(56) References Cited

U.S. PATENT DOCUMENTS

| | | | |
|---|---|---|---|
| 3,757,917 A * | 9/1973 | Waiwood et al. | 194/218 |
| 6,175,814 B1 | 1/2001 | Chrysos et al. | |
| 6,330,008 B1 | 12/2001 | Razdow et al. | |
| 6,341,357 B1 | 1/2002 | Ravichandran | |
| 6,381,635 B1 | 4/2002 | Hoyer et al. | |
| 6,467,052 B1 | 10/2002 | Kaler et al. | |
| 7,024,530 B2 * | 4/2006 | Jarvis et al. | 711/162 |
| 7,463,648 B1 * | 12/2008 | Eppstein et al. | 370/468 |
| 2002/0082856 A1 * | 6/2002 | Gray et al. | 705/1 |
| 2005/0027871 A1 * | 2/2005 | Bradley et al. | 709/227 |

* cited by examiner

*Primary Examiner* — Tammy Nguyen
(74) *Attorney, Agent, or Firm* — Perkins Coie LLP

(57) ABSTRACT

A method and an apparatus to manage data in a networked storage server have been disclosed. In one embodiment, the method includes providing a single logical layer between a number of logical subsystems in a storage server and a number of data management agents in the storage server, wherein the data management agents are operable to service requests from a number of client machines following different data management protocols, and exporting a set of application programming interfaces (APIs) from the single logical layer to interface with the data management agents.

40 Claims, 7 Drawing Sheets

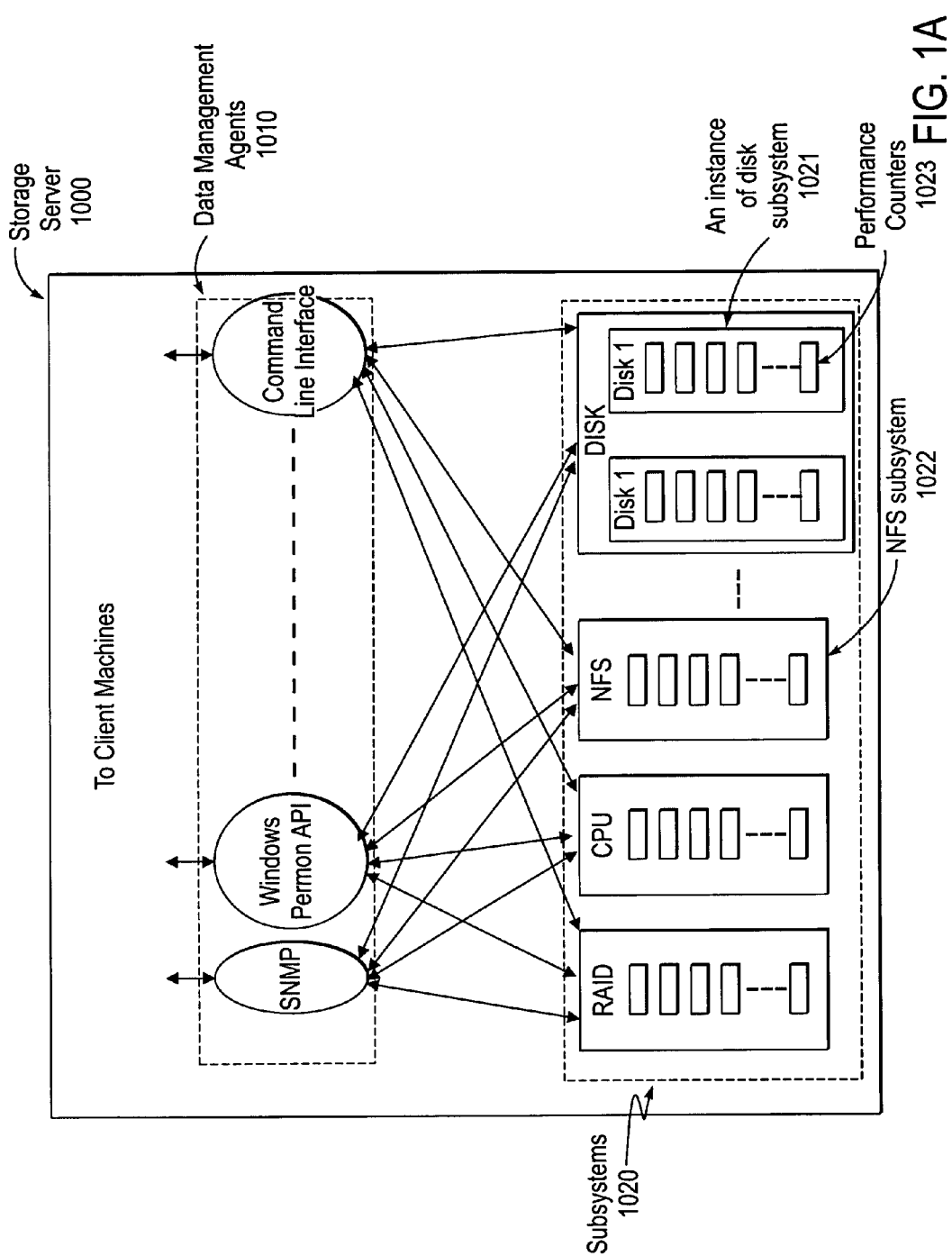

METHOD AND AN APPARATUS TO PROVIDE ACCESS TO OPERATIONAL DATA IN A STORAGE SERVER VIA MULTIPLE DATA MANAGEMENT PROTOCOLS

FIELD OF INVENTION

The present invention relates to networked data storage systems, and more particularly, to providing access to operational data within a network storage server via multiple data management protocols.

BACKGROUND

A networked data storage system may include one or more network storage servers or storage appliances. A network storage appliance may provide services related to the organization of data on storage devices, such as disks. Some of these network storage servers are commonly referred to as filers or file servers. An example of such a storage server is any of the Filer products made by Network Appliance, Inc. in Sunnyvale, Calif. The storage appliance may be implemented with a special-purpose computer or a general-purpose computer. Depending on the application, various networked data storage systems may include different numbers of storage servers.

FIG. 1A illustrates a typical contemporary storage server. The storage server 1000 includes a number of logical subsystems 1020 and a number of data management agents 1010. Each of the logical subsystems 1020 is a module performing a predetermined type of operation to enable the functioning of the storage server. A particular subsystem may have one or more instances being active at a given time. For example, one of the instances of the disk subsystem 1021 may perform operations to enable the storage server to store data on disk i that is coupled to the storage server. Another exemplary subsystem having a single instance 1022 may be responsible for managing communication to clients over data access protocols, such as Network File System (NFS). Each of the subsystems 1020 typically maintains operational data relevant to that subsystem. The operational data may be stored in the counters 1023 residing in the memory of the storage server. For example, the counters 1023 present in an instance of the disk subsystem Disk i may count the number of write operations performed on Disk i, the number of read operations performed on Disk i, etc.

In the following discussion, the terms "logical subsystem" and "subsystem" are used interchangeably to refer to the same concept. Furthermore, the terms "data management agent" and "agent" are used interchangeably in the following description. The data management agents 1010 are responsible for performing operations to support interfacing with client machines via a specific data management protocol such as Simple Network Management Protocol (SNMP). The performance data may be used by the client machines to monitor and/or manage the storage server.

Currently, to access the operational data of each of the subsystems 1020, each of the agents 1010 has to directly access the counters residing in the subsystems. However, these direct accesses may result in various inconsistencies and inaccuracies as the agents 1010 may see different views of the same data. Furthermore every time the format of the data changes, each of the agents 1010 may have to change its corresponding data access interfaces accordingly, because each agent typically has its own interface to access the subsystems 1020.

SUMMARY

The present invention includes a method and an apparatus to provide access to operational data within a network storage server via multiple data management protocols. In one embodiment, the method includes providing a single logical layer between a number of logical subsystems in a storage server and a number of data management agents in the storage server, wherein each agent is operable to service requests from a number of client machines following a predetermined data management protocol, and exporting a set of application programming interfaces (APIs) from the single logical layer to interface with the data management agents.

In a specific embodiment, the set of APIs includes one or more APIs to enable the data management agents to access operational data relevant to the subsystems.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 1A illustrates an existing storage server;

DETAILED DESCRIPTION

Figure 1B:
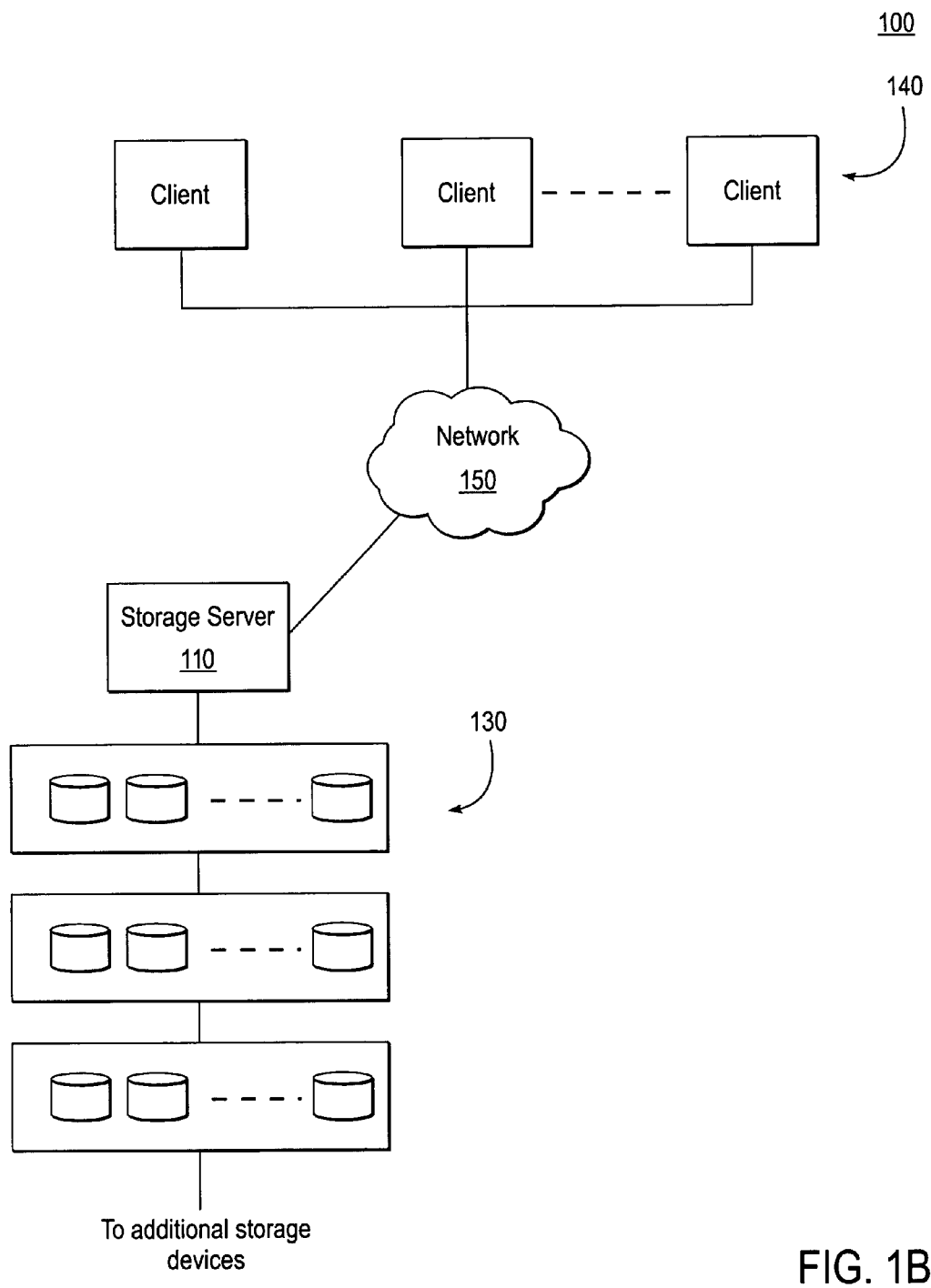
FIG. 1B illustrates an exemplary embodiment of a networked data storage system.

A method to provide access to operational data in a networked data storage system via multiple data management protocols is described. In the following description, numerous specific details are set forth. However, it is understood that embodiments of the invention may be practiced without these specific details. In other instances, well-known components, structures, and techniques have not been shown in detail in order not to obscure the understanding of this description.

Some portions of the following detailed description are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purposes, or it may comprise a general-purpose computer selectively activated or reconfigured by a computer program stored in the computer. Such a computer program may be stored in a computer readable storage medium, such as, but is not limited to any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

FIG. 1B shows a networked data storage system useable with some embodiments of the present invention. The system 100 includes a storage server 110, a network 150, a number of storage devices 130 coupled to the storage server 110, and a number of client machines 140 coupled to the storage server 110 via the network 150. The network 150 may include a wide area network (WAN), a local area network (LAN), etc. The storage devices 130 may include a number of disks organized in shelves. The disks may include one or more Redundant Array of Independent Disks (RAID) volumes.

Note that any or all of the components of system 100 and associated hardware may be used in various embodiments of the present invention. However, it can be appreciated that other configurations of the networked data storage system may include some or all of the devices disclosed above.

In one embodiment, the system 100 includes a storage area network (SAN) to transmit read/write requests at the block level of the storage server 110. A block is the basic unit used to store data in the SAN. In an alternate embodiment, the system 100 is a network-attached storage (NAS) system that transmits data at the file level. In the NAS system, complete files are retrieved instead of segments on a disk. The NAS system uses file access protocols to retrieve data, such as, for example, Network File System (NFS), or Common Internet File System (CIFS). The SAN and the NAS systems may be implemented in a single server or in separate servers.

The storage server 110 may include a number of subsystems, each providing one or more predetermined functions to enable the operation of the storage server. Each subsystem may include operational data contained in one or more counters residing in the memory of the storage server. The storage server 110 further includes a number of data management agents, some of which interface with the client machines 140 to allow the client machines 140 to access the operational data in the subsystems of the storage server 110. The storage server 110 further includes a single logical layer, which may also be referred to as a counter manager, to manage the transactions between the data management agents and the subsystems. The "single logical layer" as used herein refers to a dedicated module or logic for providing counter management on behalf of the data management agents. Using application programming interfaces (APIs) exported by the counter manager, the agents may access the data of the subsystems on behalf of the client machines 140. More detail of various embodiments of the storage server 110 is discussed below.

Figure 2:
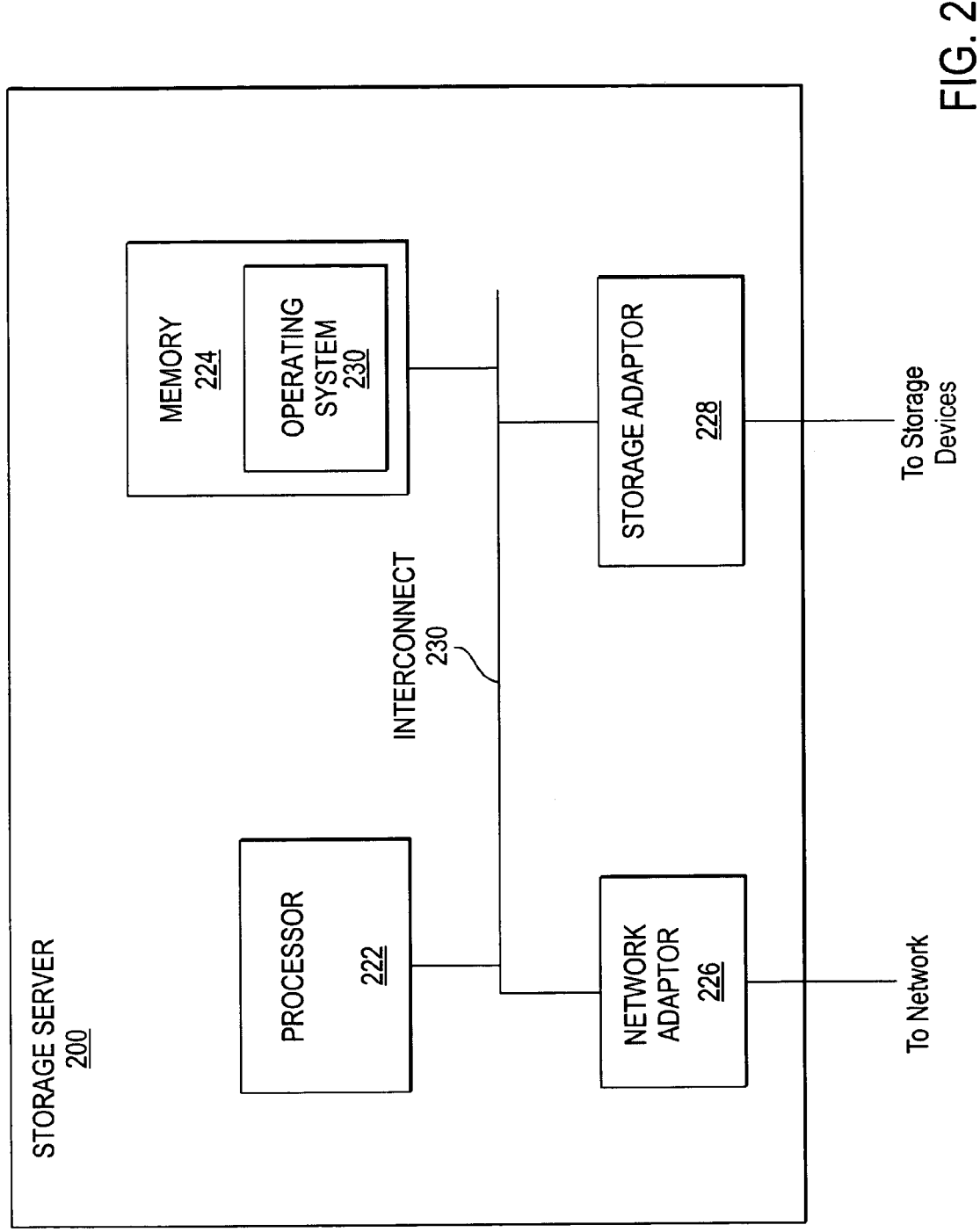
FIG. 2 illustrates one embodiment of a storage server.

FIG. 2 illustrates one embodiment of a storage server in a networked data storage system. The storage server 200 includes a processor 222, a memory 224, a network adaptor 226, and a storage adaptor 228, which are coupled to each other via an interconnect 230. In one embodiment, the storage server 200 is within a network and the network adaptor 226 interfaces with the network. The network may include a local area network (LAN), or a wide area network (WAN), etc. Data is transmitted between the storage server 200 and the network via the network adaptor 226. When data is received, the network adaptor 226 may forward the data to the storage adaptor 228, the memory 224, or the processor 222.

In one embodiment, the processor 222 reads instructions from the memory 224 and executes the instructions. The memory 224 may include any of various types of memory devices, such as, for example, random access memory (RAM), read-only memory (ROM), flash memory, one or more mass storage devices (e.g., disks), etc. In one embodiment, the memory 224 stores instructions of an operating system 230. The processor 222 may retrieve the instruction from the memory 224 to run the operating system. The processor 222 responds to requests from client machines, the network management station, or other storage servers and organizes data on the storage devices (e.g., disks) coupled to the storage server 200. The storage server 200 interfaces with the storage devices via the storage adaptor 228.

Figure 3:
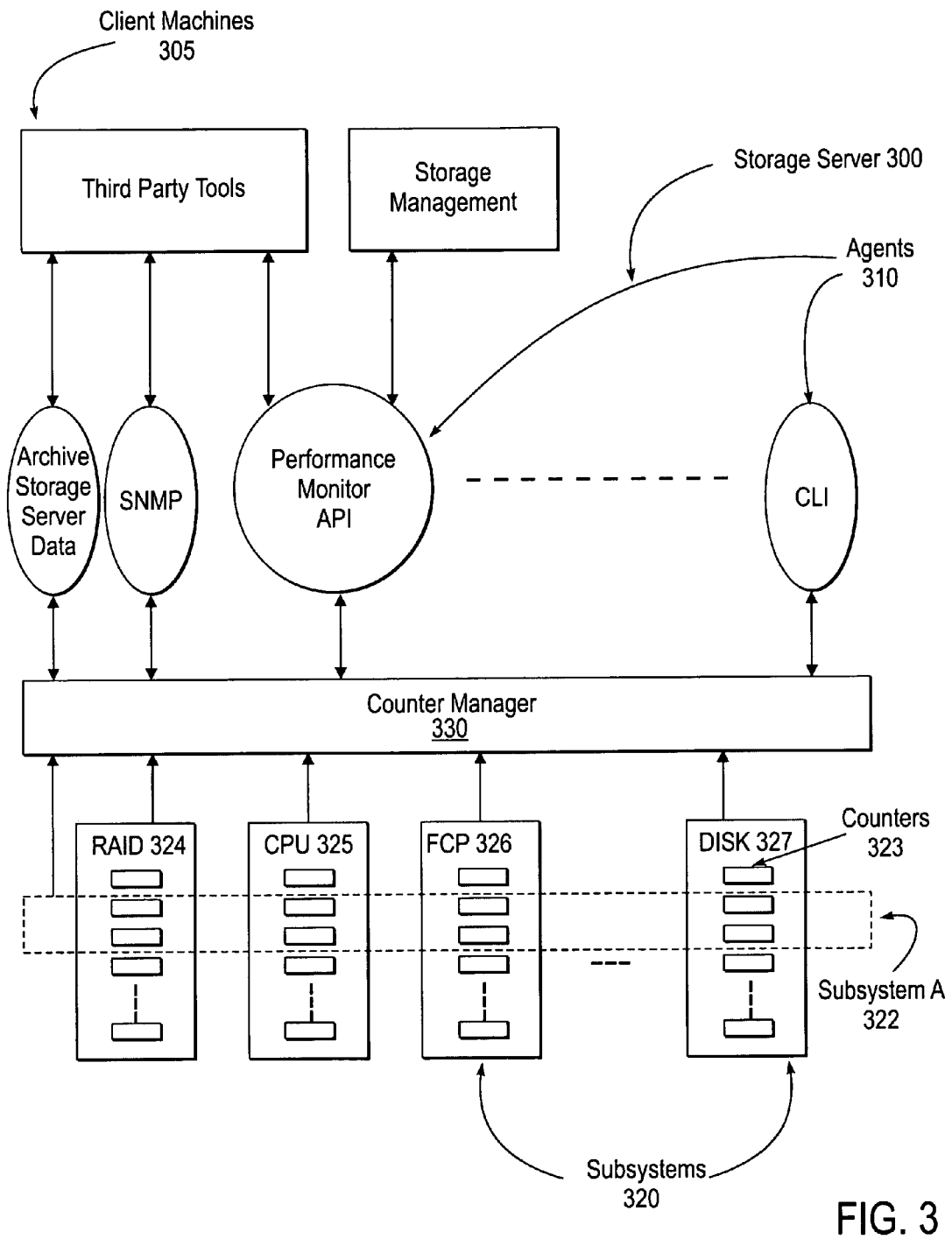
FIG. 3 illustrates a first logical representation of one embodiment of a storage server.

FIG. 3 illustrates a logical representation of one embodiment of a storage server. The storage server 300 includes a number of data management agents 310, a number of logical subsystems 320, and a counter manager 330. Each of the subsystems maintains operational data in one or more counters 323. "Operational data" as used herein includes data related to the operation of the storage server and/or the storage devices managed by the storage server. Examples of the operational data may include, but not limited to, statistical data, system status data, system configuration data, etc. Each of the subsystems 320 is logically coupled to the counter manager 330. Likewise, each of the data management agents 310 is logically coupled to the counter manager 330. Some of the agents 310 support different data management protocols, such as Simple Network Management Protocol (SNMP) or Windows® Perfmon API, to interface with various client machines 305 coupled to the storage server 300. Furthermore, some of the agents provide user interfaces accessible directly on the storage server, such as command line interface (CLI) and graphical user interface (GUI), instead of interfacing with the client machines 305.

Each of the subsystems 320 may include counters, which maintain operational data pertaining to various components of the storage server 300 or the storage devices (not shown) managed by the storage server 300. For example, the subsystem 325 may include a number of counters maintaining operational data pertaining to the central processing unit (CPU) within the storage server 300. Another example is the subsystem 326, which includes counters to maintain operational data related to FCP transactions performed by the storage server 300. Another subsystem 327 may include counters to maintain operational data pertaining to all the disks in the system (such as the storage devices 130 in FIG. 1B) managed by the storage server 300. Furthermore, the storage server may include a subsystem 324 which contains counters to maintain operational data pertaining to a RAID protected set of storage devices. In one embodiment, a logical grouping of counters residing in separate subsystems may be defined across one or more subsystems. For instance, referring to FIG. 3, the logical subsystem A 322 is defined across other subsystems, such as the subsystems 324, 325, 326, and 327, to include some of the counters in each of the subsystems 324, 325, 326, and 327.

The counter manager 330 provides a logical layer between the data management agents 310 and the subsystems 320 to manage the transactions between the agents 310 and the subsystems 320. On one side, the counter manager 330 exports a number of application programming interfaces (APIs) to interface with the agents. Using the APIs, the agents 310 access data from the counters 323 of the subsystems 320 via the counter manager 330. On the other side, the counter manager 330 provides an API which allows each of the subsystems 320 to register with the counter manager 330, in order to make the counter manager 330 aware of the counters available from that subsystem. In one embodiment, whenever a new subsystem is created, the new subsystem may register with the counter manager 330. The counter manager 330 may collect and store state information of the subsystems 320 in the memory of the storage server. The state information may include the identification codes of the subsystems 320, the number of instances of each of the subsystems 320, the names of the subsystems 320, the list of counters in each of the subsystems 320, and a pointer to a function for accessing the counters of each of the subsystems 320.

In one embodiment, the counter manager 330 manages and maintains the state information of the subsystems 320. The counter manager 330 may update the state information whenever the subsystems 320 have changed. Furthermore, the counter manager 330 may send the state information to the data management agents 310 in response to requests from the agents 310.

The counter manager 330 allows the counters 323 to be logically organized. Furthermore, by providing the APIs for the agents 310 to access data in the counters 323, the counter manager 330 may provide a consistent and accurate view of the data to the agents 310. Furthermore, when the format of the data changes, the APIs provided by the counter manager 330 may be changed to accommodate the change in the data format, and thus, the agents 310 may not have to change their corresponding data access interfaces. Hence, the use of the counter manager 330 greatly simplifies the addition of new counters in the storage server 300.

Referring back to FIG. 3, the agents 310 may use the state information from the counter manager 330 to determine whether or not to access the data of a predetermined subsystem. More detail of the use of the state information is discussed below with reference to FIGS. 4 and 5.

Figure 4:
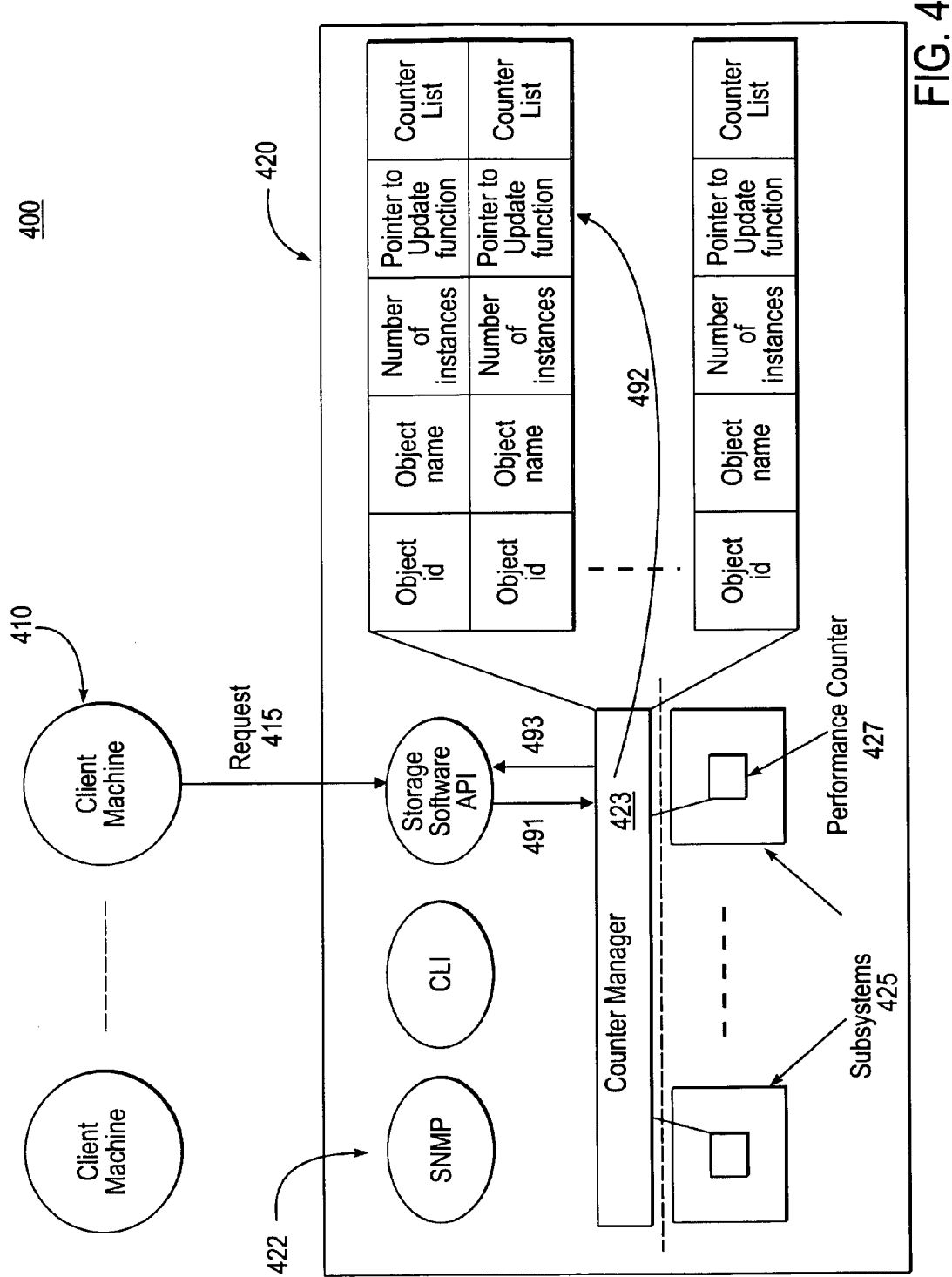
FIG. 4 illustrates a flow diagram of one embodiment of a process to provide access to operational data in a network storage server.

FIG. 4 illustrates a flow diagram of one embodiment of a process to manage operational data in a networked storage server. The process is performed by processing logic that may comprise hardware (e.g., circuitry, dedicated logic, etc.), software (such as is run on a general-purpose computer system or a dedicated machine, such as a storage server), or a combination of both.

The system 400 includes a number of client machines 410 and a storage server 420. The storage server 420 includes a number of data management agents 422, a counter manager 423, and a number of subsystems 425. Some of the agents 422 interface with the client machines 410. One of the client machines 410 may send a request 415 to one of the agents 422. The client machine 410 may request the state information of one or more of the subsystems 425 from the counter manager 423. Alternatively, the client machine may request data from the counters 427 within one or more of the subsystems 425.

Using the APIs exported by the counter manager 423, the agents 422 may get a list of all active subsystems in the storage server, decide on which subsystems to monitor, get a list of all active instances of a predetermined subsystem, get the number of instances of one subsystem, etc. These transactions are represented by the arrow 491 in FIG. 4. In one embodiment, the APIs exported by the counter manager 423 include cm_get_object_list, cm_get_object_info, cm_get_num_instances, cm_get_instance_list, cm_get_object_data, etc. One should appreciate that these APIs are merely described for the purpose of illustration. Other embodiments may include some or all of these APIs to interface with the agents 422.

In response to a request for the state information of the subsystems 425, the counter manager 423 may retrieve the requested state information as illustrated by the arrow 492 and send the requested state information to the requesting agent as illustrated by the arrow 493.

If the agent requests data from the counters of a predetermined subsystem, the agent may allocate space in the storage server for temporarily storing the data. The counter manager 423 may check whether the allocated space is enough to hold the requested data. If there is enough allocated space for the requested data, the counter manager 423 calls the registered update function using the corresponding update function pointer stored by the counter manager 423 as illustrated by the arrow 492. The registered update function then copies the requested data into the allocated space and notifies the client as illustrated by the arrow 493 in FIG. 4.

Figure 5:
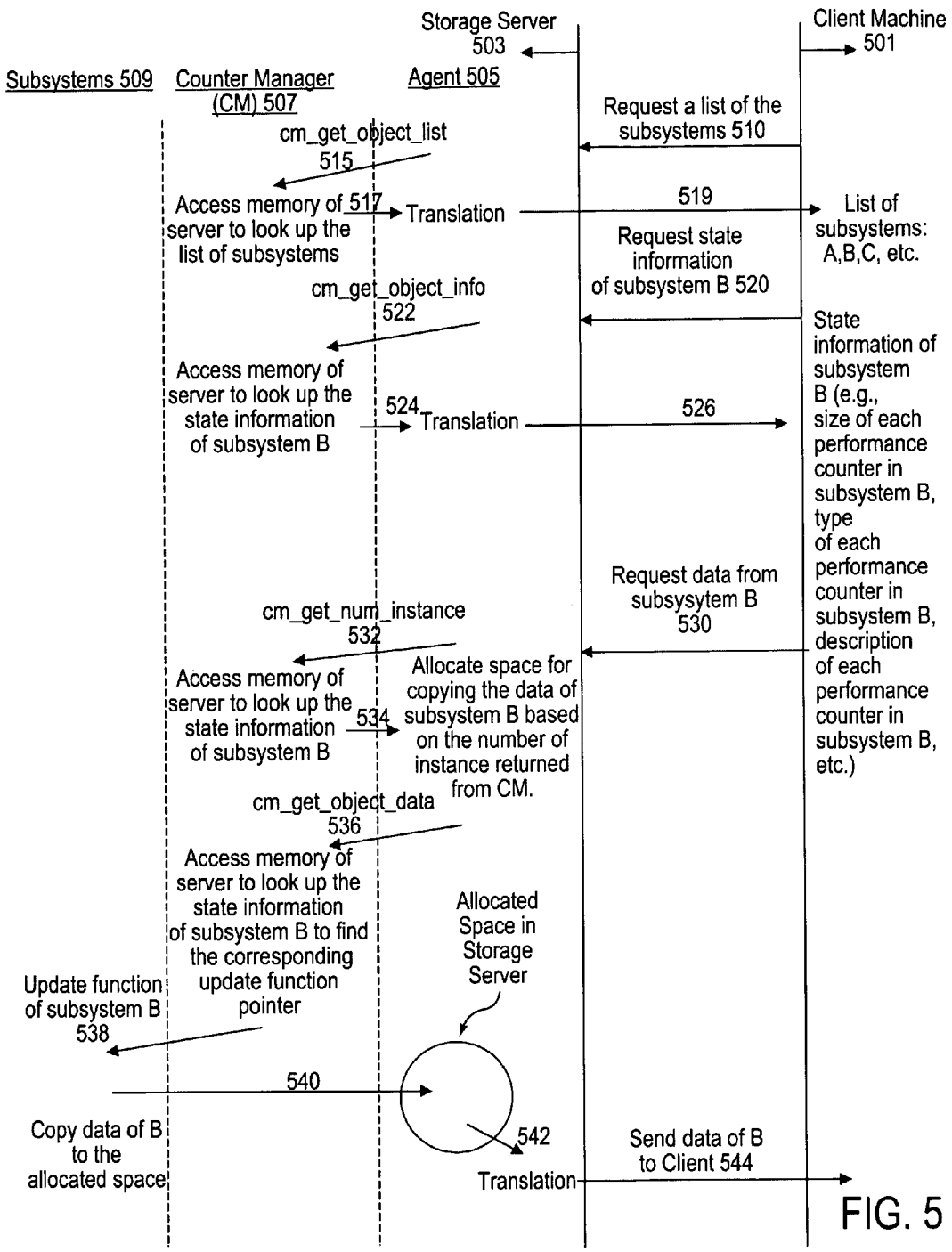
FIG. 5 is a diagram illustrating function calls in one embodiment of a process to provide access to operational data in a network storage server.

FIG. 5 illustrates a flow diagram of one embodiment of a process to access data in a storage server in response to requests from a client machine. The process is performed by processing logic that may comprise hardware (e.g., circuitry, dedicated logic, etc.), software (such as is run on a general-purpose computer system or a dedicated machine, such as a storage server), or a combination of both.

In one embodiment, the process illustrated in FIG. 5 involves transactions between a client machine 501 and a storage server 503. The storage server 503 includes at least one agent 505 to interface with the client machine 501, a counter manager 507, and one or more subsystems 509. The counter manager 507 exports a number of APIs to interface with the agent 505. Examples of the APIs may include cm_get_object_list, cm_get_object_info, cm_get_num_instance, cm_get_object_data, etc.

Initially, the client machine 501 sends a request 510 for a list of the subsystems in the storage server 503 coupled to the client machine 510. In response to the request 510, an agent within the storage server uses the API, cm_get_object_list 515, to cause the counter manager to access the memory of the storage server to look up the list of subsystems in the storage server. The counter manager sends the list of subsystems to the agent at 517. The agent may translate the list into a form specific to the protocol used by the agent to communicate with the client, and may send the list to the requesting client machine at 519. The list may include subsystems A, B, C, etc.

The client machine 501 may send a request 520 for the state information of one of the subsystems in the storage server 503, such as subsystem B. In response to the request for the state information, the agent 505 calls cm_get_object_info 522 to cause the counter manager to access the memory of the storage server 503 (such as the memory 224 in FIG. 2) in order to look up the state information of subsystem B. The counter manager 507 retrieves the state information of subsystem B and sends the state information to the agent 505 at 524. The agent 505 translates the state information and sends the translated state information to the client machine 501 at 526. The state information may include the size, the type, and the description of each performance counter in subsystem B.

The client machine 501 may send a request 530 for the data held in the counters relevant to subsystem B. In response to the request 530, the agent 505 may call cm_get_num_instance 532 to find the number of instances of subsystem B. In response to cm_get_num_instance 532, the counter manager 507 accesses the memory of the storage server 503 to look up the number of instances of subsystem B from the state information stored by the counter manager 507. The counter manager 507 then sends the number to the agent 505 at 534. Based on the number of instances of subsystem B, the agent 505 allocates space in the storage server memory for copying the data from subsystem B. Then the agent 505 calls cm_get_object_data 536 to cause the counter manager 507 to access the memory of the storage server 503 to find the pointer to an update function of subsystem B. Then the counter manager 507 calls the update function 538 using the pointer to copy the data from the counters of subsystem B to the allocated space at 540. The agent 505 translates the data copied to the allocated space at 542 and then sends the translated data to the client machine 501 at 544.

Figure 6:
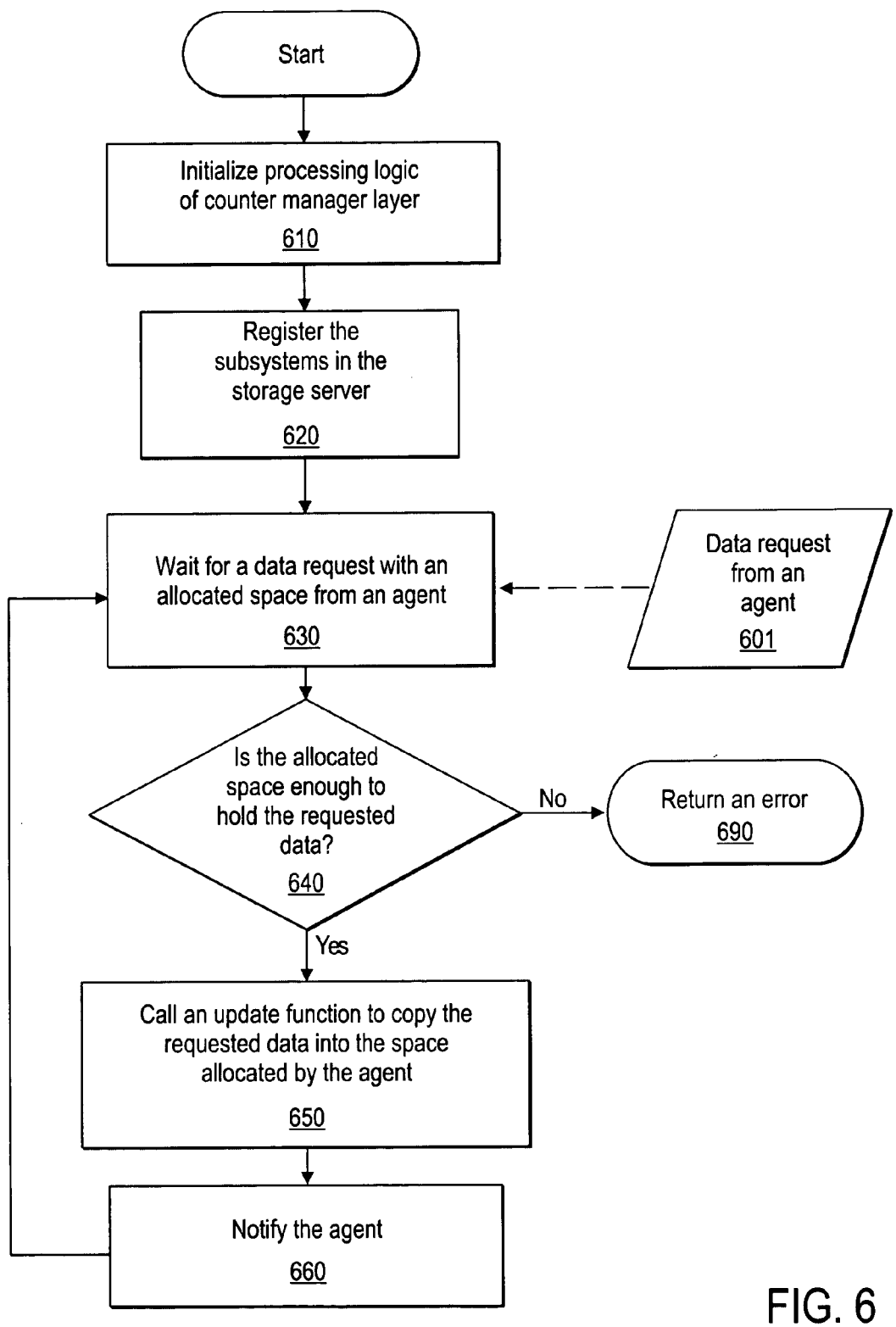
FIG. 6 is a flow diagram of one embodiment of a process to provide access to operational in a network storage server.

FIG. 6 illustrates a flow diagram of an embodiment of a process to manage data in a networked storage server. The process is performed by processing logic that may comprise hardware (e.g., circuitry, dedicated logic, etc.), software (such as is run on a general-purpose computer system or a dedicated machine, such as a storage server), or a combination of both.

Processing logic provides a single logical layer between a number of data management agents and a number of subsystems in a storage server (processing block 610). This single logical layer may, for example, include a counter manager, such as the counter manager 330 or 423. Processing logic registers the subsystems with the counter manager (processing block 620). Processing logic may collect state information of the subsystems and store the state information in a memory of the storage server (such as the memory 224 in FIG. 2). The state information may include the identification codes of the subsystems, the number of instances of each of the subsystems, the names of the subsystems, the list of counters in each of the subsystems, and a pointer to a function for accessing each of the subsystems. Processing logic waits for a data request from one of the agents (processing block 630). The requesting agent may allocate space in the memory of the storage server for temporarily holding the requested data.

When processing logic receives a data request 601 from an agent, processing logic determines whether the allocated space is enough to hold the requested data (processing block 640). If not, then processing logic returns an error (processing block 690). Otherwise, processing logic calls an update function to copy the requested data into the space allocated by the agent (processing block 650). Processing logic may use the pointer to the update function to call the update function. Then processing logic notifies the agent (processing block 660). Processing logic may then return to processing block 630 to wait for another request from one of the agents.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A method comprising:
providing in a storage server a plurality of logical subsystems and a plurality of data management agents, wherein the plurality of data management agents are operable to service requests from a plurality of external entities each following a different data management protocol; and
providing in the storage server a single logical layer between the plurality of logical subsystems and the plurality of data management agents, and exporting a plurality of application programming interfaces (APIs) from the single logical layer to interface with the plurality of data management agents.

2. The method of claim 1, further comprising allowing the plurality of data management agents to access data of the plurality of logical subsystems using the plurality of APIs.

3. The method of claim 2, wherein each of the plurality of logical subsystems comprises a plurality of counters in the storage server to generate operational data relevant to the corresponding logical subsystem.

4. The method of claim 3, wherein the operational data includes statistical data.

5. The method of claim 1, further comprising: collecting state information of the plurality of logical subsystems; and storing the state information.

6. The method of claim 5, wherein the state information of the plurality of logical subsystems includes an identification code for each of the plurality of logical subsystems, a number of instances of each of the logical subsystems, and a pointer to an access function of each of the plurality of logical subsystems.

7. The method of claim 5, further comprising: managing the state information of the plurality of logical subsystems; and
sending the state information of one of the plurality of logical subsystems to one of the plurality of data management agents in response to a request for the state information from the data management agent.

8. The method of claim 1 further comprising, registering the plurality of logical subsystems to collect and to store state information of each of the plurality of logical subsystems in the single logical layer, the state information including a pointer to an update function to access the one or more counters in each of the plurality of logical subsystems.

9. The method of claim 8 further comprising, managing the state information of each of the plurality of logical subsystems.

10. The method of claim 9 wherein in response to a request from a first agent of the plurality of agents to access operational data of one of the plurality of logical subsystems, calling the corresponding update function using the corresponding pointer to retrieve operational data from the one or more counters of the one of the plurality of logical subsystems, and notifying the first agent of the retrieved operational data.

11. The method of claim 10 wherein in response to a request for the state information from a second agent of the plurality of agents, sending the state information from the single logical layer to the second agent.

12. A method comprising:
registering a plurality of logical subsystems in a storage server, each of the plurality of logical subsystems including one or more counters, each of which maintains operational data of the corresponding logical subsystem, wherein said registering includes collecting and storing state information of each of the plurality of logical subsystems, wherein the state information includes a pointer to a function to access the one or more counters of each of the plurality of logical subsystems; and
accessing, by a counter manager in the storage server, the operational data of one of the plurality of logical subsystems in response to a request from one of a plurality of agents in the storage server, the plurality of agents each following a different data management protocol to enable the storage server to communicate with a plurality of entities external to the storage server, the plurality of external entities including a client machine.

13. The method of claim 12, wherein accessing the data of one of the plurality of logical subsystems comprises calling the corresponding function of the logical subsystem using the corresponding pointer.

14. The method of claim 13, wherein the request allocates a destination and the corresponding function copies the data of the logical subsystem to the destination.

15. The method of claim 14, further comprising notifying the agent that has requested the data after the data of the logical subsystem has been copied to the destination.

16. The method of claim 12, further comprising sending the state information to an agent in response to a request for the state information from the agent.

17. A method comprising:
managing transactions between a plurality of logical subsystems in a storage server and a plurality of agents in the storage server by using a counter manager in the storage server, the counter manager forming a single logical layer between the plurality of logical subsystems and the plurality of agents, the plurality of agents each following a different data management protocol to service requests from a separate one of a plurality of external entities; and
maintaining state information of the plurality of logical subsystems by using the counter manager.

18. The method of claim 17, further comprising interfacing a plurality of client machines with one or more of the plurality of agents.

19. The method of claim 18, wherein the different data management protocols include simple network management protocol (SNMP).

20. The method of claim 17, wherein the plurality of agents includes a command line interface (CLI) module.

21. The method of claim 17, wherein the plurality of agents includes a graphical user interface (GUI) module.

22. The method of claim 17, wherein managing the transactions includes allowing the plurality of agents to access operational data from a plurality of counters within the plurality of logical subsystems through the counter manager.

23. A non-transitory machine-accessible storage medium that stores instructions which, when executed by a processor, will cause the processor to perform operations comprising:
receiving a request at a counter manager in a storage server from one of a plurality of agents in the storage server, the request being a request to provide operational data relevant to a logical subsystem of a plurality of logical subsystems in the storage server, each of the plurality of agents implementing a different data management protocol for servicing requests from an external entity; and
accessing the logical subsystem within the storage server, by using the counter manager, in response to the request and providing the operational data relevant to the logical subsystem to the agent, the logical subsystem including a counter to generate at least a portion of the operational data of the logical subsystem.

24. The non-transitory machine-accessible medium of claim 23, wherein the operations further comprise:
calling a predetermined function to copy the operational data to a destination specified by the request; and
sending a notification after the operational data has been copied.

25. The non-transitory machine-accessible medium of claim 24, wherein the operations further comprise:
registering the logical subsystem to store a pointer to point to the predetermined function.

26. A processing system comprising:
a plurality of logical subsystems;
a plurality of agents configured to interface with a plurality of external entities each following a different protocol, the plurality of agents further configured to service requests from the plurality of external entities; and
a counter manager, operatively coupled between the plurality of logical subsystems and the plurality of agents, configured to manage transactions between the plurality of logical subsystems and the plurality of agents, including servicing requests from the plurality of agents for operational data and state information relating to the plurality of logical subsystems.

27. The processing system of claim 26, wherein the counter manager is configured to provide a plurality of application programming interfaces (APIs) to allow the plurality of agents to access data of the plurality of logical subsystems.

28. The processing system of claim 27, further comprising a plurality of counters within each of the plurality of logical subsystems, wherein the counter manager maintains state information of the plurality of counters.

29. The processing system of claim 28, wherein the state information includes a pointer to a predetermined function to copy operational data from the plurality of counters.

30. The processing system of claim 26, wherein the plurality of logical subsystems, the plurality of agents, and the counter manager are within a storage server.

31. A storage server comprising:
a plurality of logical subsystems;
a processor; and
a memory storing a plurality of instructions which when executed by the processor cause the storage server to perform a plurality of operations, the plurality of operations comprising:

providing a plurality of agents to interface with a plurality of external entities, each of the plurality of agents configured to service requests for state information and operational data from a different one of the plurality of external entities by using a different protocol, the plurality of external entities including a data management client;

providing a counter manager to manage transactions between the plurality of agents and the plurality of logical subsystems, including servicing requests for state information and operational data relating to the plurality of logical subsystems; and exporting a plurality of application programming interfaces (APIs) from the counter manager to allow the plurality of agents to access the operational data and state information relating to the plurality of logical subsystems.

32. The storage server of claim 31, wherein the plurality of operations further comprise:

maintaining state information of the plurality of logical subsystems using the counter manager.

33. The storage server of claim 31, wherein the plurality of operations further comprise:

accessing one of the plurality of logical subsystems in response to a request from one of the plurality of agents.

34. A storage system comprising:

a plurality of storage devices; and a storage server, coupled to the plurality of storage devices, to manage data storage in the plurality of storage devices, the storage server including:

a plurality of logical subsystems;

a plurality of agents to interface with a plurality of external entities each following a different management protocol, the plurality of external entities including a client machine; and a counter manager to manage transactions between the plurality of logical subsystems and the plurality of agents.

35. The storage system of claim 34, wherein the storage server further comprises a processor, and one of the plurality of logical subsystems includes a counter to generate operational data of the processor.

36. The storage system of claim 34, wherein one of the plurality of logical subsystems includes a plurality of counters to maintain operational data of one or more of the plurality of storage devices.

37. The system of claim 36, wherein the operational data comprises a number of write operations and a number of read operations on the one or more of the plurality of storage devices within a predetermined period.

38. The system of claim 34, further comprising a plurality of client machines coupled to the storage server, wherein the plurality of agents accesses data of the plurality of logical subsystems in response to requests from the plurality of client machines.

39. A method comprising:

providing a single logical layer between a plurality of logical subsystems in a storage server and a plurality of agents in the storage server, each of the plurality of agents for servicing requests from a different one of a plurality of external entities by using a different data management protocol, the plurality of external entities including a client machine, and each of the plurality of logical subsystems including one or more counters;

exporting a plurality of application programming interfaces (APIs) from the single logical layer to allow the plurality of agents to access operational data of the plurality of logical subsystems using the plurality of APIs;

registering the plurality of logical subsystems to collect and to store state information of each of the plurality of logical subsystems in the single logical layer, the state information including an identification code for each of the plurality of logical subsystems, a number of instances of each of the plurality of logical subsystems, and a pointer to an update function to access the one or more counters in each of the plurality of logical subsystems;

managing the state information of each of the plurality of logical subsystems;

in response to a request from a first agent of the plurality of agents to access operational data of one of the plurality of logical subsystems, calling the corresponding update function using the corresponding pointer to retrieve operational data from the one or more counters of the one of the plurality of logical subsystems, and notifying the first agent of the retrieved operational data; and in response to a request for the state information from a second agent of the plurality of agents, sending the state information from the single logical layer to the second agent.

40. An apparatus comprising:

means for providing in a storage server a single logical layer between a plurality of logical subsystems of the storage server and a plurality of data management agents in the storage server, one or more of the plurality of data management agents configured for servicing requests from a plurality of client machines each following a different data management protocol; and means for exporting a plurality of application programming interfaces (APIs) from the single logical layer to interface with the plurality of data management agents.

* * * * *